June 25, 1963     K. G. HELLNER     3,094,941

TRACK SYSTEMS

Filed Dec. 20, 1960     3 Sheets-Sheet 1

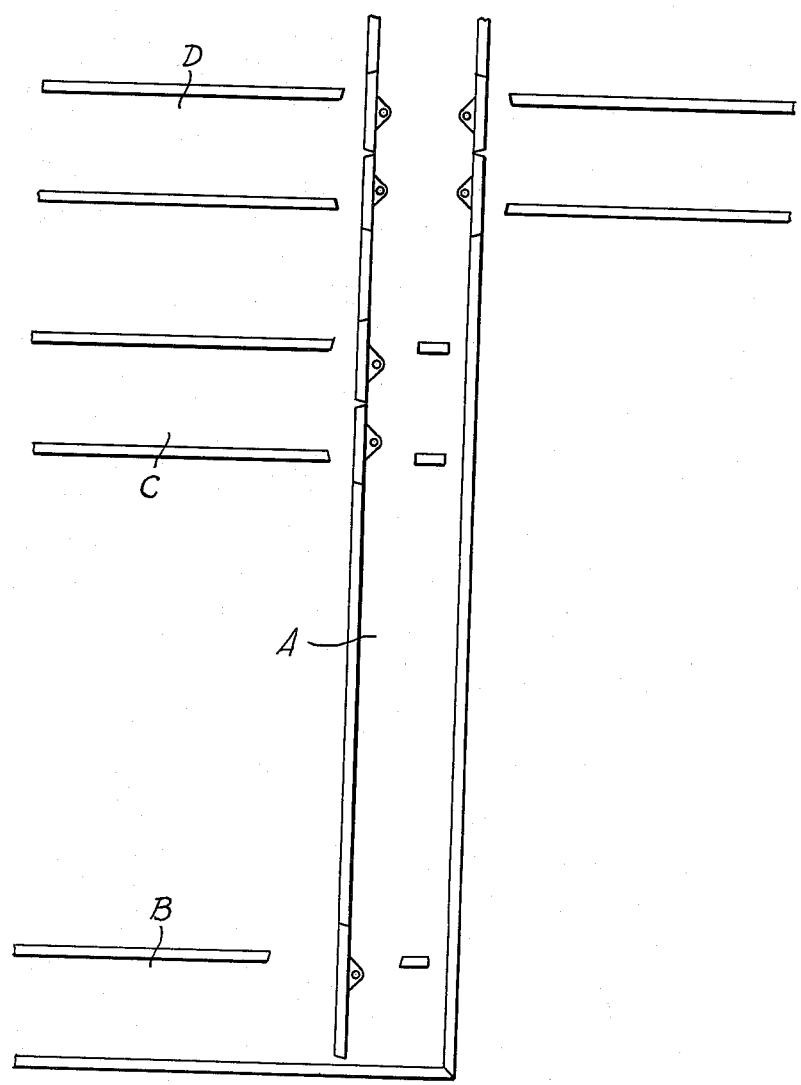

June 25, 1963 K. G. HELLNER 3,094,941
TRACK SYSTEMS
Filed Dec. 20, 1960 3 Sheets-Sheet 3
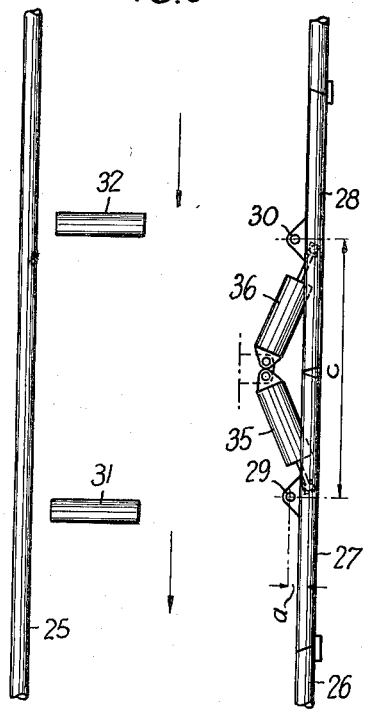
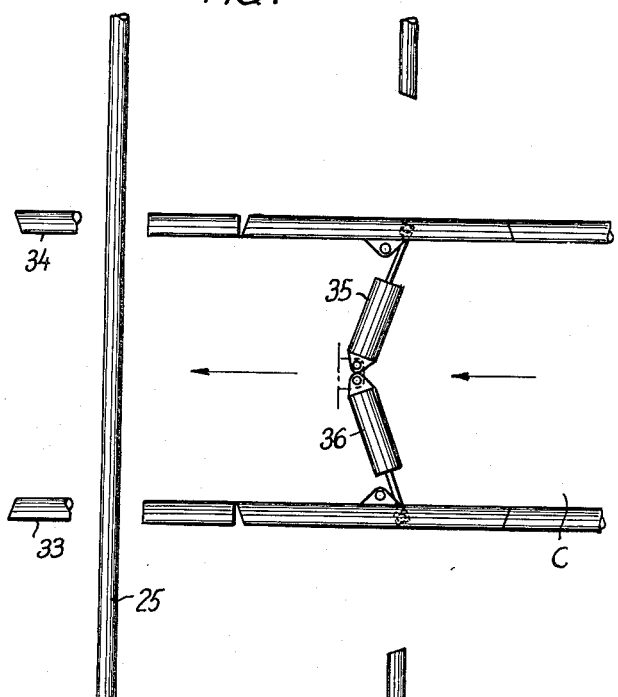
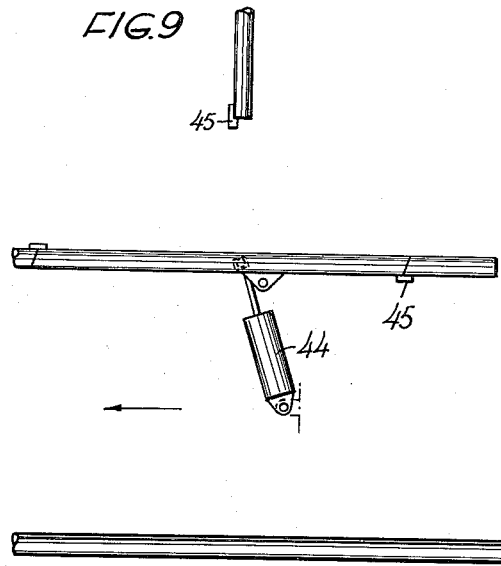
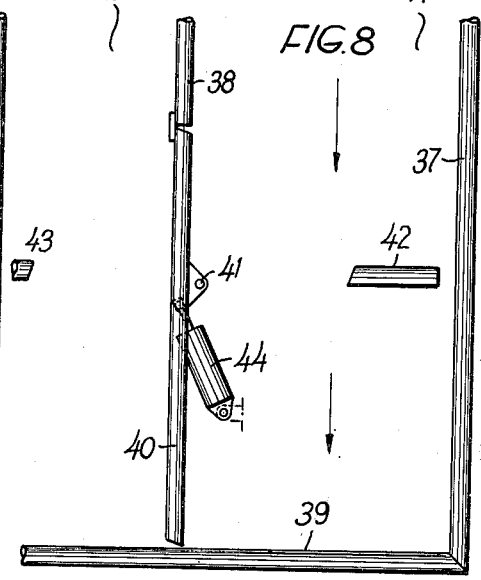

United States Patent Office 3,094,941
Patented June 25, 1963

3,094,941
TRACK SYSTEMS
Karl Gustaf Hellner, Alingsas, Sweden, assignor, by mesne assignments, to AB Transportpatent, Stockholm, Sweden, a corporation of Sweden
Filed Dec. 20, 1960, Ser. No. 77,124
Claims priority, application Sweden Dec. 22, 1959
10 Claims. (Cl. 104—130)

This invention relates to track systems adapted to support a movable carriage thereon and more particularly to track systems including parallel spaced rails having support surfaces extending substantially parallel with the plane of said track system.

It is a principal object of the invention to provide a track system in which a carriage, supported thereon by suspension or support wheels, can undergo changes of direction of movement on the track system without need for rotating the carriage.

Another object of the invention is to provide means by which said carriage automatically is centered on the tracks independently of the direction of travel of same.

A further object of the invention is to transfer the carriage from one track to another on the track system according to the invention, without undue shock and vibration shakes;

A still further object of the invention is to provide a track system which is economical to produce and is readily adaptable to automatic guiding.

Further advantages and features of the invention will become apparent from the following description of the embodiments acocrding to the invention, as shown in the accompanying drawings in which:

FIG. 5 shows in plan view three examples of different crossings of tracks according to the embodiment of FIG. 4 including new and improved switches;

FIG. 6 is an enlarged plan view of a track crossing according to one of the examples of FIG. 5, with the switch in one position of adjustment;

FIG. 7 is a view similar to FIG. 6, showing the switch in another position of adjustment;

FIG. 8 is an enlarged plan view of another of the examples of FIG. 5, with the switch in one position of adjustment; and FIG. 9 is a view similar to FIG. 8, with the switch in another position of adjustment.

Figure 1:
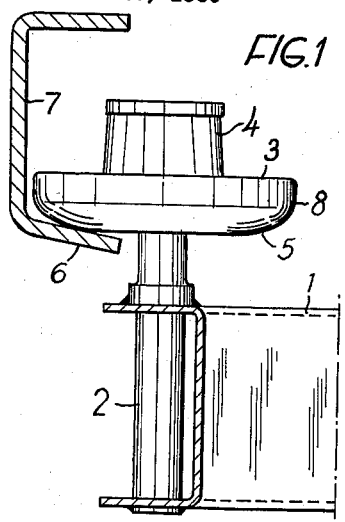
FIG. 1 is a side view of a suspension wheel in accordance with an embodiment of the invention, the corresponding rail being shown in section.

In FIG. 1 the carriage, adapted to run on tracks according to the invention, comprises a frame of beams 1, preferably of rectangular form, and provided at its corners with shafts 2 extending perpendicular to the plane of said frame. Said shafts 2 support suspension or support wheels 3, which preferably are journalled in thrust bearings enclosed in housings 4. The downwardly facing side 5 of said suspension wheels rest on the top surface of an inwardly turned flange 6 of the rail 7, which may be of U-, L-, or suitable cross-sectional shape.

While the carriage is moving, points of different radii on the surface 5 resting on the flange 6 have different speeds in the direction of travel of the carriage, so that there is a certain degree of sliding between the suspension wheel and said flange. To decrease the friction caused by said sliding, the surface 5 is convex in shape and said flange is arranged with a downwardly sloping support surface, thus decreasing the area of the contact surface. Thereby the carriage is also transversely guided so that the outer edge of the suspension wheels 3 can be suitably spaced from the vertical flange of rail 7, whereby the wheel will contact the vertical flange only for large lateral movements of the wheel.

Figure 2:
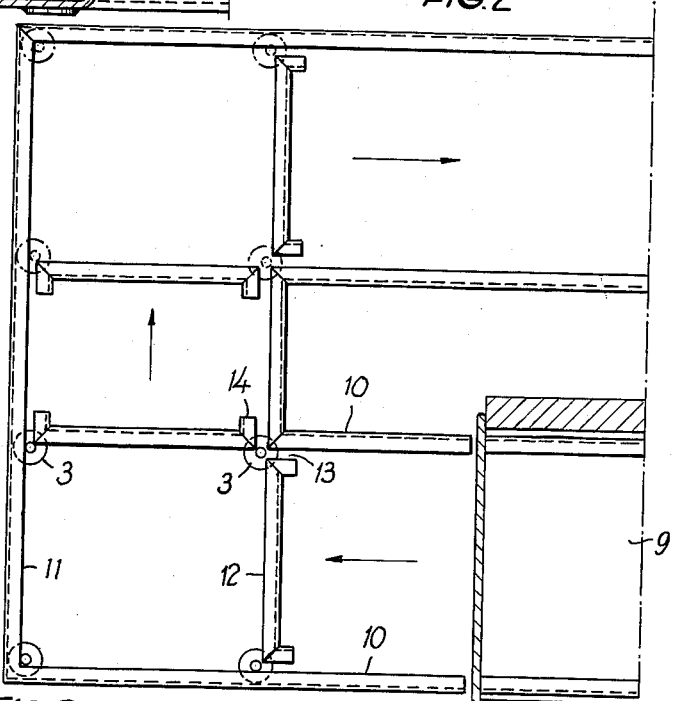
FIG. 2 shows in plan view a track arrangement for the embodiment of FIG. 1.

FIG. 2 shows an example of a track system adapted for cooperating with a carriage according to FIG. 1, the track system being arranged as an endless path. The arrows in FIG. 2 indicate the direction of travel of the carriages on the track system.

It is of great importance that the track system occupy as little space as possible, in addition to avoiding movable members such as switch points and turntables. This is achieved by using carriages with suspension wheels according to the invention. To change the direction of such a carriage, it need only be transferred onto a crossing track without the necessity of turning the carriage in the new direction of travel. For example, a carriage heading in a direction parallel to the rails 10, is arrested with the front suspension wheel 3 supported on rail 11, and the rear suspension wheels on rail 12, extending parallel to rail 11. The rail sections at the rail crossings are cut off such that spaces 13 are formed for passage of the shafts 2 and the ends of the free rail sections are provided with laterally directed reinforcement or guiding projections 14, the top sides of which are arranged somewhat below the supporting surface 6 of the rails, since the suspension wheels 3 cannot be simultaneously supported at points situated on opposite sides of shaft 2. It is, of course, possible for the rails 10 to extend beyond the crossing tracks 11, 12, and for several crossing tracks to be provided.

When the carriage is moved over the rails 11 and 12, the carriage moves in a direction parallel to the rails 11, 12 with the carriage still oriented in the same direction as when it moved on the rails 10. Thus, the carriage always faces in the same direction, regardless of the path of movement thereof.

Figure 3:
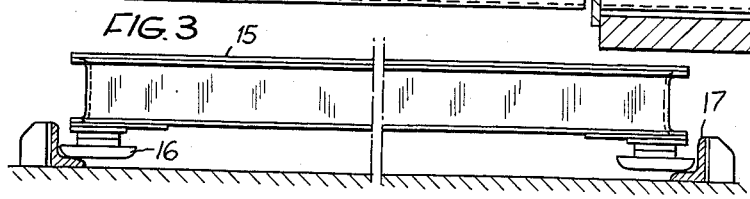
FIG. 3 is a side view of a carriage according to a second embodiment of the invention.

The only difference between the carriage 15 shown in FIG. 3 and that in FIG. 1 is that the carriage 15 rests on support wheels 16. The rails 17 are L-beams, the supporting flange of which slopes sufficiently to cooperate in appropriate manner with the convex surface of the support wheel 16. The overall height of such a carriage is relatively small and a track system therefor is simpler than the one described before.

Figure 4:
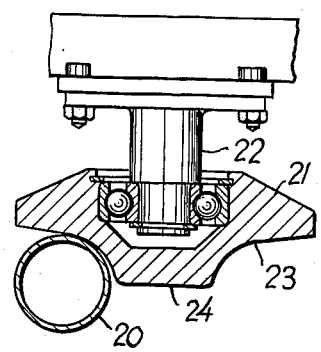
FIG. 4 is an axial section of a suspension wheel and a rail according to a third embodiment of the invention.

In the embodiment of the invention shown in FIG. 4, the rail is in the shape of a tube, and the latter is supported above ground. By using tubes as rails, it is possible to increase the speed of travel of the carriages, since tubes can be manufactured with smooth surfaces at a relatively low cost. Moreover, tubes have good strength properties. As is evident from FIG. 4, the carriage is supported on a tubular rail 20 by suspension wheels 21, which are rotatable about shafts 22, extending perpendicularly to the track plane. Each suspension wheel 21 rests on the tube with a contact surface 23, which is of curved convex shape and has a radius of curvature somewhat larger than the outer radius of said tube, so that said suspension wheel rests on the rail with a small contact area, thereby allowing the wheel to roll against the tube without undue sliding within the contact area. The curvature of the contact surface preferably extends into the hub 24 of the suspension wheel, said hub, together with the hub of the opposite suspension wheel, resting on the other rail of the track, forming a wedge which keeps the carriage centered on the track.

Each carriage is provided with four suspension wheels, preferably arranged at the corners of said carriage. Thereby, the shafts of said wheels define the corners of a square, so that the gauge is the same for two tracks crossing each other at right angles.

Crossings for rails consisting of tubular rails can, of course, be constructed in the same way as described with reference to FIG. 2, but such crossings exhibit disadvantages which are of special importance at higher speed of travel. When the suspension wheels pass the spaces formed in the rails for the passage of the shafts, the wheels have a tendency to sink into the spaces, resulting in shocks and vibrations in the carriages. These are particularly noticeable and damaging at high speeds. Furthermore, the lateral support for a suspension wheel is interrupted when the wheel passes such a space in the rail, whereby the carriage can swing laterally and the wheel shaft can become wedged in said space.

To overcome the above-mentioned disadvantages, the present invention includes special new and advantageous switch means, adapted to achieve direct and abrupt direction changes of the movements of carriages moving along tracks of the type stated.

FIG. 5, shows a track provided with some embodiments of switch means at the switch points. In the figure, A denotes a main track; B a branch track extending from one side of said main track A, at an end thereof; C a branch track, also extending to one side of the main track A, but from an intermediary location thereon; D a branch or crossing track, extending on both sides of the main track A, also from an intermediate location along the length of track A. To facilitate explanation, crossings at right angles have been illustrated; however, the switch means according to the invention can also be used for track crossings which are inclined at an acute angle.

The switch means for the branch track C is shown in greater detail in FIGS. 6 and 7, FIG. 6 showing the switch means in the position of adjustment for straight travel along the main track A, and FIG. 7 showing the switch means adjusted for travel along the branch track C.

With reference to FIG. 6, the rail 25 of the main track A, which the carriage does not have to cross at a direction change of travel, is formed by an uninterrupted rail, while the other rail of them ain track A, i.e. the rail the carriage has to cross when changing the direction of travel, is divided at the switch means in three places to form two rail sections 27 and 28, said rail sections being swingable about pivot axes 29 and 30 respectively, said axes extending perpendicularly to the plane of the tracks. In the example shown, said pivot axes are positioned a distance "a" from the center line of rail sections 27, 28, in a direction towards the other rail 25 of the track. Said distance "a" is equal to the distance between the center line of a tubular rail and the rotation axis of a suspension wheel 23 supported on the rail. In the example, the rotation axes of said suspension wheels are positioned between the rails, but the rotation axes could also be positioned outside the rails, provided the pivot axes of the swingable rail sections are also placed outside the rails, the above-noted distances still remaining equal.

The distance "c" between the pivot axes 29, 30 of said rail sections is equal to the distance between the rotation axes of a pair of suspension wheels in the new direction of travel. In the example shown, the axes of the suspension wheels form the corners of a square, the gauge thus being the same for the two tracks crossing each other at right angles.

The rail sections 27, 28 extend to a point halfway between the swinging axes of the rail sections. The ends of the rail sections are chamfered to permit free swinging of the sections together.

As seen in FIG. 6, the branch track C comprises two parallel rail pieces 31 and 32, situated between the rails 25 and 26 of the main track A, the outer ends of said rail pieces being spaced from uninterrupted rail 25 of the main track A a distance large enough to allow free passage of the shaft of the suspension wheels therebetween. The rail pieces 31 and 32 extend such a suitable distance in the direction of rail C so that when the rail sections 27, 28 are swung 90° from the position shown in FIG. 6, they are aligned with rail pieces 31 and 32 and preferably are in contact therewith. On the opposite side of the interrupted rail 26 of the main track A, the branch track C includes tubular rails 33 and 34, whose ends directed towards the main track are located and positioned such that the tubular rails 33 and 34 form direct extensions of said rail sections 27 and 28 respectively, when the latter have been swung 90° from the position of FIG. 6, as can be seen in FIG. 7.

The switch means described above operates in the following manner:

When a carriage, which is moving along the main track A, is to be transferred onto the branch track C, the swingable rail sections 27 and 28 initially occupy the position shown in FIG. 6. By suitable means (not shown) the carriage is stopped in a position whereat the suspension wheels of the carriage supported on the uninterrupted rail 25 of the main track assume a position between the extensions of said rail pieces 31 and 32. The rotation axes of the wheels will be substantially at the distance "a" inside the center line of respective rail piece. The suspension wheels of the carriage supported on the interrupted rail 26 of the main track occupy a position whereat the rotation axes of the wheels substantially coincide with the pivot axes 29 and 30 respectively of the rail sections 27 and 28. After the carriage has been stopped in this position, the rail sections 27 and 28 are swung, for example, by hydraulic jacks 35 and 36, through an angle of 90°, from their original positions. The rail sections rotate in opposite directions (i.e. rail 27 clockwise, rail 28 counterclockwise), the ends of the rail sections which were initially farthest apart thereby are brought towards each other. After the completion of this swinging movement, the swingable rail sections 27 and 28 bridge the interruptions between the rail pieces 31 and 32 and the rails 33 and 34 respectively of the branch track C, so that the carriage can be moved along the branch track.

During the swinging movement, the rail sections roll against the hubs of the suspension wheels 23 and if the carriage should be somewhat displaced in either direction, it will be forced into correct position by the swinging rail sections. When the carriage is moved onto the rails 33 and 34 of the branch track C, the rail sections 27, 28 can remain in the rotated position or be returned to their original positions, as desired.

The switch means adapted for changing the direction of movement of the carriage at the end of the main track A onto the branch track B, is shown in FIGS. 8 and 9, and is of simpler construction than the switch means for track C, since only one suspension wheel has to cross a rail.

The main track A includes, as before, one uninterrupted rail 37 and one interrupted rail 38. The end of uninterrupted rail 37 meets uninterrupted rail 39 of the branch track B at right angles. The interrupted rail 38 of the main track A terminates in a rail section 40, which is swingable around a pivot axis 41. In accordance with the embodiment in FIGS. 6 and 7, said pivot axis is positioned at a distance "a" from the center line of said rail section. The pivot axis 41 is furthermore arranged, relative to the uninterrupted rails 37 and 39, such that when a suspension wheel of the carriage is at the junction of rails 37 and 39, the axis 41 coincides substantially with the rotation axis of the diagonally opposite suspension wheel.

The rail section 40 extends in both directions from the pivot axis 41 and one of its ends extends to the uninterrupted rail 39 of the branch line B, while the other end of rail 40 extends to the interrupted rail 38 of the main track A. The latter end of the rail is located a distance from the pivot axis 41, which is less than the gauge of the tracks. The ends of said rail sections are chamfered as in the previous embodiment, to allow swinging movement of the rail section.

The interrupted rail of the branch track B comprises a fixed rail piece 42, extending parallel to the uninterrupted rail 39 of the branch track, and located between the rails of the main track A. One end of rail piece 42 forms a space with the uninterrupted rail 37 of the main track A, to allow the passage of the shafts of said suspension wheels. On the opposite side of said rail section 40, the interrupted rail of the branch track B extends as a fixed tubular rail 43. The rail 43 is spaced a distance from said rail piece 42, which is equal to the length of said swingable rail section 40, such that when the rail section 40 is rotated 90° from its initial position in FIG. 8, rail 40 forms a direct connection between said rail piece 42 and said rail 43, as shown in FIG. 9.

The switch means described above works substantially in the same manner as the one described in connection with rail C. In traveling along the main track A, the carriage is stopped with one of its front wheels at the junction between uninterrupted rails 37 and 39. The rail section 40 is then swung 90° by hydraulic jack 44, about swinging pivot axis 41. When the rail section 40 has completed its swinging movement, the carriage can then be moved along the branch track B at right angles to the direction of movement thereof, along track A, without the necessity of rotating the carriage into the new direction of travel.

The ends of the stationary rails or rail pieces which cooperate with the ends of said swingable rail sections, may be provided with stop means 45, which serve to center the swingable rail sections in alignment with the stationary rails or rail pieces, and to support the free ends of the said rail sections.

The switch means schematically shown at the branch track D in FIG. 5, corresponds to the switch means shown in FIGS. 6 and 7 and for branch track C, but there is provided a separate switch means operatively associated with each rail of track A. Thus, both rails of the main track include swingable rail sections, each rail including two rail sections abutting each other. It is clear that the swingable rail sections for both rails of track A can be made to abut one another when they are rotated 90°, to thereby form a continuation of the interrupted rails of track D, whereby the need for intermediate rail sections such as 31 and 32 for track C can be eliminated. The pivot axes of all the rail sections are arranged to coincide with the rotation axes of the suspension wheels of a carriage when the latter is in position for a change of direction of travel from track A to track D.

The rails can be supported in any suitable way, but they are preferably arranged above the ground on suitable supports. The rail sections are preferably swingable about fixed shafts in journals fastened to the rail sections.

From the above description, it will be apparent that the disclosed embodiments are susceptible of modification with regard to shape, proportions, detail construction and arrangement of parts without departing from the invention as defined in the following claims.

What is claimed is:

1. A carriage supporting assembly comprising a plurality of tracks arranged in a common plane and intersecting one another, and at least one carriage including supporting wheels supported on said tracks, said wheels having axes of rotation which are perpendicular to said plane and stationary relative to said carriage, each said track comprising at least two parallel rails in spaced relation, each of which rails include a supporting surface for supporting said wheels, said supporting surfaces of at least one of said parallel rails being interrupted at the intersection of said tracks to form a passage thereat to permit the wheels of said carriage to be transferred from said one rail onto the rail of the intersecting track, one of said rails at the intersection including means comprising a guiding projection extending parallel to the other of said rails at said intersection and constituting a limit for movement of said wheels transverse of said other rail whereby the carriage is transferable to an intersecting track without turning of the carriage.

2. A carriage supporting assembly comprising a plurality of tracks arranged in a common plane and intersecting one another, and at least one carriage including supporting wheels supported on said tracks, said wheels having axes of rotation which are perpendicular to said plane and stationary relative to said carriage, each said track comprising at least two parallel rails in spaced relation, each of which rails includes a supporting surface lying in a common plane for supporting said wheels, said supporting surfaces of at least one of said parallel rails being interrupted at the intersection of said tracks to form a passage thereat to permit the wheels of said carriage to be transferred from said one rail onto the rail of the intersecting track, one of said rails at the intersection including means comprising a guiding projection extending parallel to the other of said rails at said intersection and constituting a limit for movement of said wheels transverse of said other rail, said projection including a supporting surface extending parallel to the plane of said supporting surfaces on the rails and therebelow whereby the carriage is transferable to said intersecting track without turning of the carriage.

3. A carriage supporting assembly comprising a plurality of tracks arranged in a common plane and intersecting one another, and at least one carriage including supporting wheels supported on said tracks, said wheels having axes of rotation which are perpendicular to said plane and stationary relative to said carriage, each said track comprising at least two parallel rails in spaced relation, each of said rails includes a supporting surface for supporting said wheels, said supporting surfaces of at least one of said parallel rails being interrupted at the intersection of said tracks to form a passage thereat to permit the wheels of said carriage to be transferred from said one rail onto the rail of the intersecting track, whereby the carriage is transferable to said intersecting track without turning of the carriage, said rails being constituted by tubes and said supporting wheels each including a concave surface resting on said tubes, said concave surface having a radius of curvature larger than the radius of said tube.

4. A carriage supporting assembly comprising a plurality of tracks arranged to a common plane and intersecting one another and at least one carriage including supporting wheels supported on said tracks, said wheels having axes of rotation relative to said carriage, each said plane and stationary relative to said carriage, each said track comprising at least two parallel rails in spaced relation, each of which rails includes a supporting surface for supporting said wheels, said supporting surfaces of at least one of said parallel rails being interrupted at the intersection of said tracks to form a passage thereat to permit the wheels of said carriage to be transferred from said one rail onto the rail of the intersecting track, at least one of said rails including a rail section which is swingably supported for movement between a position aligned with the latter said rail and a position aligned with the rail intersecting therewith, said rail section being effective to bridge said interruption in the supporting surface of said one rail in one of said positions of the rail section.

5. An assembly as claimed in claim 4, wherein said rail section has an axis of rotation extending perpendicularly to the plane of the tracks and spaced from said one rail a distance which is equal to the distance between said rails and the axis of rotation of the supporting wheels.

6. An assembly as claimed in claim 4, wherein said rail section has an axis of rotation which is intermediate the ends of said rail section and which extends perpendicularly to said plane and spaced from said rail a distance which is equal to the distance between said rails and the axis of rotation of the supporting wheels.

7. An assembly as claimed in claim 4 wherein said rail section has an axis of rotation substantially coinciding with axis of rotation of a suspension wheel of said carriage with the latter in position on said rail section for change of direction at said intersection of said rails.

8. An assembly as claimed in claim 3 wherein said tracks extend perpendicularly to one another and in which an interruption is provided in each of the intersecting rails at each intersection of said tracks, said assembly comprising switch means to transfer said carriage to intersecting rails at said intersections, said means including four swingable rail sections movable in paired relation to bridge the interruptions in the rails of one of said tracks at each intersection.

9. An assembly as claimed in claim 3 wherein one of said tracks is a main track and another of said tracks is a branch track extending at right angles to said main track and to one side thereof, one of the rails of said main track being positioned adjacent the branch track and provided with an interruption, the assembly comprising switch means including two swingable rail sections operative to jointly bridge said interruption in the main track, each swingable section being effective to individually bridge the interruptions in the rails of said branch track.

10. An assembly as claimed in claim 3 wherein said assembly comprises switch means to transfer said carriage from one track onto another, the two tracks meeting each other at right angles, a rail of each of the latter two tracks being provided with an interruption at said meeting, the switch means including a swingable rail section for selectively bridging one of said latter interruptions.

References Cited in the file of this patent

UNITED STATES PATENTS

| | | |
|---|---|---|
| 724,757 | Symonds | Apr. 7, 1903 |
| 794,367 | Mari | July 11, 1905 |
| 2,229,015 | King | Jan. 14, 1941 |
| 2,469,575 | Ralston et al. | May 10, 1949 |
| 2,943,579 | Geddes | July 5, 1960 |